United States Patent [19]

Züchner et al.

[11] 4,173,021
[45] Oct. 30, 1979

[54] SEALING ELEMENT FOR AN AUTOMATIC DRAFTING PEN

[75] Inventors: Werner Züchner, Hamburg; Walter Jozat, Bad Bramstedt, both of Fed. Rep. of Germany

[73] Assignee: Koh-I-Noor Rapidograph, Inc., Bloomsbury, N.J.

[21] Appl. No.: 960,673

[22] Filed: Nov. 14, 1978

[30] Foreign Application Priority Data

May 13, 1978 [DE] Fed. Rep. of Germany ....... 2821612

[51] Int. Cl.² ............................................. G01D 15/16
[52] U.S. Cl. .................................. 346/140 R; 346/141
[58] Field of Search ............................. 346/140 R, 141

[56] References Cited

U.S. PATENT DOCUMENTS

| 4,097,874 | 6/1978 | Anderka et al. ............... 346/140 R |
| 4,106,031 | 8/1978 | Jozat .............................. 346/140 R |

*Primary Examiner*—George H. Miller, Jr.
*Attorney, Agent, or Firm*—David H. Semmes; Warren E. Olsen

[57] ABSTRACT

A sealing element for an automatic drafting pen with a tubular tip wherein a reciprocating horizontal actuating means that acts through a linkage operates a horizontal slide that in one position permits the pen to contact the drafting surface and in a second position seals the pen with the horizontal slide.

7 Claims, 5 Drawing Figures

SEALING ELEMENT FOR AN AUTOMATIC DRAFTING PEN

CROSS-REFERENCE TO RELATED APPLICATIONS

An improvement upon the invention disclosed in the joint applicants' U.S. Pat. No. 4,106,031, entitled AUTOMATIC DRAFTING DEVICE, as well as copending Ser. No. 922,629, filed July 7, 1978.

BACKGROUND OF THE INVENTION

Field of the Invention

An automatic drafting instrument of the type wherein a plurality of stylographic pens are reciprocably supported with respect to a drafting surface. Such pens include sealing elements which are laterally slidable into and out of contact with the writing pen tip, respectively, as the pen is raised to its storage position and as the pen is dropped to its writing position. The present invention provides a linkage which lifts the pen from the sealing element without sliding of the sealing element across the pen tip.

SUMMARY OF THE INVENTION

The invention refers to an automatic drawing apparatus containing at least one tube writer in a writing head. The tube writer is movable from an elevated storage position, in which its forward end is situated above the writing base, to a lowered drawing position, in which its forward end is in contact with the drawing base. The apparatus has a sealing element which, in storage position, seals off the forward end of the tube writer and, during writing, is withdrawn and held to the side of the tube writer.

With the drawing apparatus described in earlier filed application Ser. No. 922,629, it is possible to seal off the writing tube while in storage position by means of a sealing element, which is swung or moved to the side of the writing tube, so as not to interfere with the writing process. The use of this sealing element ensures that the tube writer is always ready for drawing, even when left in storage position for an extended time, thus eliminating any interference with the automatic functioning of the drawing apparatus.

In this prior drawing apparatus the sealing element and, in certain instances, even the tube writer can be damaged, (especially if the diameter of the tube or writing tip is particularly small), when the sealing element is swung to the side while still in contact with the writing tube. This has been necessary to stop the sealing function on the one hand and to move the tube writer down to the writing position on the other. The problem with the prior apparatus is that the forward end of the tube writer is in direct contact with the upper surface of the sealing element during the first part of the swinging process.

In an attempt to alleviate this problem, it has been suggested (German Pat. No. P 27 07 2588), that a blocking apparatus be installed that could be engaged with the tubewriter and which would hold the tube writer in its storage position until the sealing element had been swung completely to the side and out of the path of the tube writer. This means that the sealing element could be swung out of sealing position without the forward end of the writing tube coming in contact with the sealing element during the swinging process, thus eliminating the possibility that the weight of the tube writer and possibly that of a pen be forced onto the sealing element.

With the prior drawing apparatus, however, difficulties could arise. The sealing element was moved out of sealing position by an essentially lateral movement in relation to the writing tube. During the sealing process a certain deformation, i.e. indentation, is caused by the pressure of the forward end of the writing tube on the sealing element, and in the process of moving the sealing element away from the writing tube in a lateral direction the sealing element can become grooved or torn, or, as is the case with tube writers for small line widths, the tube writer itself can be damaged.

To avoid these problems, it has been suggested (German Pat. No. P 27 50 937.1) that the sealing element be moved down and away in the first segment of the process of moving it from its sealing position to its lateral position and then out of the tube writer's lowering area in the second segment of the process. The tube writer is held in the storage position by the blocking apparatus until the second segment of the moving process is completed.

Damage to the sealing element and/or to fine line pens was effectively eliminated by the above-described two phase movement of the sealing element since the sealing element moved first down and then, after separation from the writing tube, to the side. However, the two movement phases travel a relatively longer path and thus require a relatively longer period of time. This meant that there was a relatively long time lag when starting to draw.

With this discovery, the sealing element of an automatic writing apparatus described in U.S. application Ser. No. 922,629 can be moved quickly and without damage to itself and/or to the tube writer to and from sealing position.

As a solution to this problem, an automatic writing apparatus according to U.S. Ser. No. 922,629 will be so equipped that the tube writer can be elevated to an intermediate position in which the forward end of its writing tube is situated above the sealing element, and that the tube writer with the sealing element moved to the side is movable from the intermediate position to the drawing position.

With the drawing apparatus constructed accordingly, the tube writer is first lifted to an intermediate position so that the writing tube separates from the sealing element. Then the sealing element is moved out of the lowering area of the tube writer with a simple lateral movement. The tube writer is then lowered from the intermediate position to the writing position, so that the writing tip comes in contact with the writing base.

DESCRIPTION OF THE PREFERRED EMBODIMENTS

Figure 1:
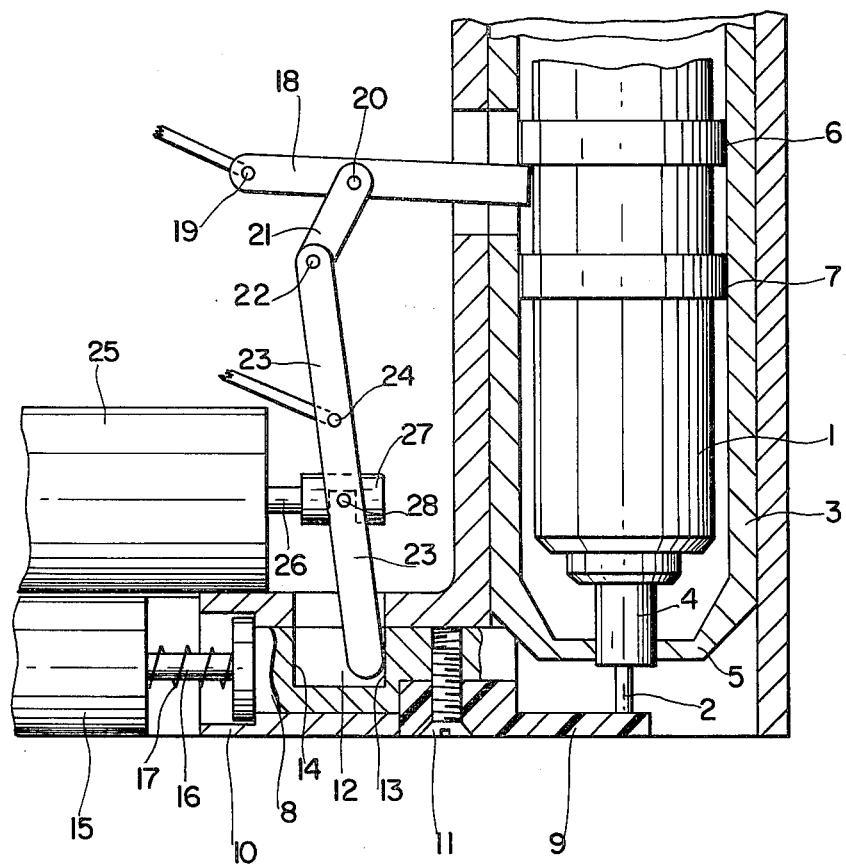
FIG. 1 is a partially fragmentary side elevation, showing a tube writer in an automatic drawing apparatus, having a sealing element, engaging the writing tip and an assembly for moving the tube writer and the sealing element.

The tube writer 1 depicted in FIG. 1 is arranged in a drawing head 3 which is illustrated schematically. The tube writer 1 reveals a cylindrical section 4 in which the writing tube tip 2 is secured. The cylindrical section 4 serves to guide the tube writer in area 5 of the drawing head as do the ring ridges 6 and 7 in the rear part of the tube writer.

Figure 2:
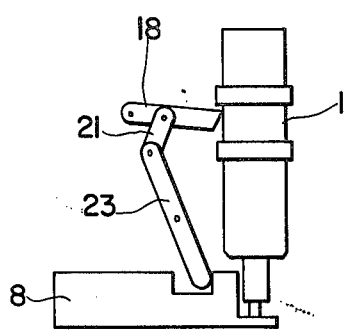
FIG. 2 is a schematic of FIG. 1, showing the writing tip and sealing element in the same operational position.

The writing tube 2 rests on a sealing element 9 made of elastic material, so that an effective seal is produced on the writing tube in the position illustrated in FIGS. 1 and 2, thus preventing the drawing ink from drying out. The sealing element 9 is part of a slide 8 which is supported in a housing part 10 and to which the sealing element 9 is attached by a screw 11. In the upper part of the slide 8 there is a slot or groove 12 opening to the top with side walls 13 and 14. The slide 8 is held in the position indicated in FIG. 1 by a compression spring 17. This compression spring 17 is braced on the one side against the slide 8 and on the other side against the housing of a magnet 15 whose pestle 16 is connected to the slide 8.

Above slide 8 and to the side of the tube writer a contact lever 18 is attached at its stationary axis 19. This lever 18 extends through a side opening in housing 10 and in the drawing head 3 and through the area between ring ridges 6 and 7. At point 20 on this lever 18 one end of the first lever 21 is attached so as to rotate. The other end of the first lever 21 is attached at point 22 to one end of the second lever 23 so as to rotate. This second lever 23 is attached at a stationary axis 24 so as to rotate and supports a peg or bolt 28 beneath and running parallel to the stationary axis 24. This peg or bolt 28 extends into a furrow within carrier element 27 which is attached to the pestle 26 of the magnet 25. The free end of lever 23 opposite the rotational attachment point 22 extends into groove 12 and lies against the side wall 13 as illustrated.

The position depicted in FIG. 1 is the storage position in which the writing tube or tip 2 is sealed off by the sealing element 9. This position is also schematically shown in FIG. 2.

Figure 3:
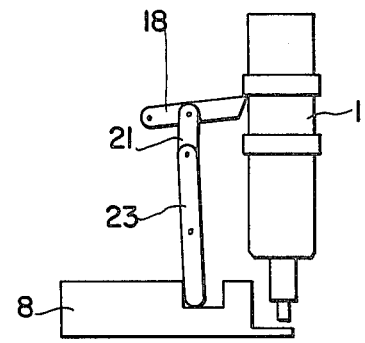
FIG. 3 is a schematic, showing the tube writer in intermediate position.

To bring the tube writer into writing position, the magnet 25 is activated and the pestle 26 is moved to the left, thereby swinging lever 23 clockwise around its stationary axis 24 so that the free end of this lever comes in contact with the side wall 14 of slot 12 in slide 8, and so that lever 21 and 23 come into a position where their longitudinal axes come into essentially a straight line (FIG. 3). As a result of this movement of levers 21 and 23, the contact lever 18 is swung up somewhat around its stationary axis 20, so that its free end comes in contact with the lower surface of ring ridge 6, thus raising the tube writer 1 into the intermediate position illustrated in FIG. 3. In this position the lower end of the writing tube 2 is no longer in contact with the sealing element 9.

Figure 4:
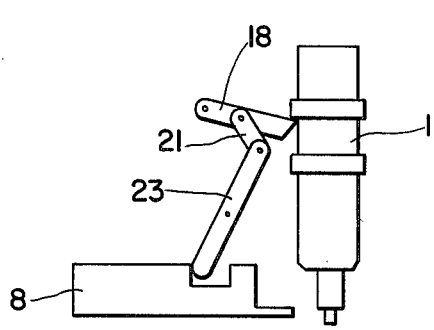
FIG. 4 is a schematic, showing tube writer in drawing position.

As illustrated in FIG. 4 and when the motion of pestle 26 of the magnet 25 continues to the left, the free end of the lever 23 is swung farther clockwise, and by engaging the side wall 14 of slot 12, the slide 8 is moved against the pressure of compression spring 17 to the left, while at the same time the free end of the contact lever 18 is moved farther down. Since the movement of pestle 26 of magnet 25 is practically instantaneous, the free end of the contact lever 18 disengages immediately after the levers 21 and 23 as illustrated in FIG. 3 align themselves. The tube writer then drops into its writing position in which the writing tube comes in contact with the writing base, as illustrated in FIG. 4. With the tube writer in writing position, the free end of the contact lever 18 is located immediately above the ring ridge 7 and thereby prohibits the tube writer's slamming against the drawing base while dropping down.

Furthermore, in the position depicted in FIG. 4, the magnet 15 can be activated to hold the slide 8 to the side against the compression spring 17, and the magnet 25 can be switched off. This securing of the slide 8 and with it, of the sealing element 9, in the side position, makes it possible to raise and lower the tube writer 1 while drawing (as in making a dotted line) without the sealing element 9 coming in contact with the writing tube 2 with every stroke. The intent is that the writing tube 2 be sealed off only when the tube writer 1 is lifted from the drawing base for a predetermined period of time, e.g. 15 seconds, since it would be less likely that such a pause would occur in the normal drawing process, and that such a pause would normally signal the end of drawing.

Figure 5:
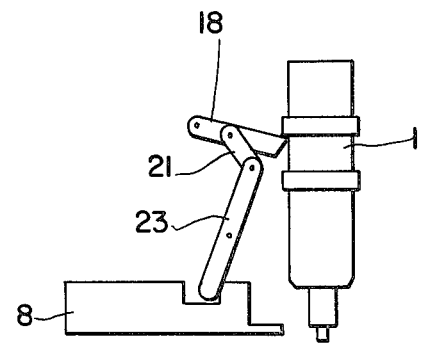
FIG. 5 is a schematic, showing the tube writer in intermediate position and with the sealing element moved to the side.

When the tube writer is to be moved from the writing position in which the slide 8 is held to the side by the magnet 15, magnet 25 is switched over so that the pestle 26 moves to the right. This swings levers 21 and 23 from the position depicted in FIG. 4 to the position depicted in FIG. 5, so that the contact lever 18 lifts the tube writer 1 with its free end to the intermediate position. Since, however, the free end of lever 23 (as shown in FIG. 5) rests against side wall 13 of slot 12 in the slide 8 (still pushed to the left), levers 21 and 23 cannot be swung past their aligned position to a position as shown in FIG. 2, but are pulled while still in contact with the side wall 13 by the activation of magnet 25 to a nearly aligned position in which the tube writer is to the intermediate position, illustrated in FIG. 5.

In case the tube writer should need to be lowered again before magnet 15 is switched off, magnet 25 is switched on once more and its pestle 26 is moved to the left, so that the tube writer 1 is lowered to writing position as described above and according to FIG. 4.

If within the predetermined time span, the tube writer does not lower, magnet 15 is deactivated and compression spring 17 moves the slide 8 to the right, so that the sealing element 9 comes under the writing tube 2, as illustrated in FIG. 3. As a result of the movement of side wall 13 of slot 12 to the right brought about by the process immediately above, the pestle 26 of the magnet 25 continues its motion to the right and thereby brings levers 21 and 23 and, with them, contact lever 18 to the position indicated in FIG. 2. This again lowers the tube writer 1 to its storage position and seals off the writing tube 2.

We claim:

1. A sealing element for an automatic drafting pen of the type having a tubular writing tip comprising:
   A. A base including a vertically reciprocable drawing head;
   B. A pen mounted within said drawing head, said pen having at least one lateral protrusion in an upper portion and with its writing tip extending through a bottom portion of said head for engagement with a drafting surface;

C. A horizontal slide supported within said base and including: i. a sealing element engagable with the pen tip in a pen raised, storage position; ii. a horizontal slide actuating means; and D. Linkage supported upon said base and releasably interconnecting said horizontal actuating means and said lateral protrusion in upper portion of said pen, such that horizontal actuation of said slide pivots said linkage with respect to said lateral protrusion, so as to permit falling of said pen onto said sealing element in one pivot mode and in another mode, pivots said linkage such that said pen drops onto the drafting surface.

2. A sealing element for an automatic drafting pen as in claim 1, said linkage in an intermediate position abutting said protrusion in the upper portion of said pen, so as to lift said pen out of contact with said sealing element and the drafting surface.

3. A sealing element for an automatic drafting pen as in claim 2, said horizontal slide including a first solenoid mounted in said base and reciprocably engaging said slide.

4. A sealing element for an automatic drafting pen as in claim 3, said pen having two lateral protrusions in its upper portion as a limit for an upper free end of said linkage.

5. A sealing element for an automatic drafting pen as in claim 4, including a second solenoid element mounted in said base and engagable with said linkage, so as to pivot said linkage from a first collapsed mode of storage of said pen against said sealing element to an intermediate linkage extended mode wherein said pen is lifted vertically with respect to said sealing element, thence to a second collapsed mode for writing wherein said pen is permitted to fall onto a drafting surface.

6. A sealing element for an automatic drafting pen as in claim 5, said slide including two abutments, defining a recess into which a lower free end of said linkage extends as a limit for engagement of said lower free end during pivoting of said linkage.

7. A sealing element for an automatic drafting pen as in claim 6, said second solenoid element being deactivatable for brief periods, so as to permit intermittent lifting of said pen vertically with respect to the drafting surface and without engaging said sealing element, as in drafting dotted lines.

* * * * *